US 10,978,055 B2

(12) United States Patent
Kubo et al.

(10) Patent No.: US 10,978,055 B2
(45) Date of Patent: Apr. 13, 2021

(54) INFORMATION PROCESSING APPARATUS, INFORMATION PROCESSING METHOD, AND NON-TRANSITORY COMPUTER-READABLE STORAGE MEDIUM FOR DERIVING A LEVEL OF UNDERSTANDING OF AN INTENT OF SPEECH (71) Applicant: Toyota Jidosha Kabushiki Kaisha, Toyota (JP)

(72) Inventors: Chikage Kubo, Chofu (JP); Takuji Yamada, Musashino (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 134 days.

(21) Appl. No.: 16/273,481

(22) Filed: Feb. 12, 2019

(65) Prior Publication Data
US 2019/0251958 A1 Aug. 15, 2019

(30) Foreign Application Priority Data
Feb. 14, 2018 (JP) .............................. JP2018-024449

(51) Int. Cl.
| G10L 15/18 | (2013.01) |
| G10L 21/10 | (2013.01) |
| G10L 25/72 | (2013.01) |
| G06T 13/00 | (2011.01) |
| G10L 15/22 | (2006.01) |
| G10L 13/027 | (2013.01) |
| G06F 40/20 | (2020.01) |

(52) U.S. Cl.
CPC .......... *G10L 15/1822* (2013.01); *G06F 40/20* (2020.01); *G06T 13/00* (2013.01); *G10L 13/027* (2013.01); *G10L 15/22* (2013.01); *G10L 21/10* (2013.01); *G10L 25/72* (2013.01); *G10L 2015/223* (2013.01); *G10L 2015/225* (2013.01)

(58) Field of Classification Search
CPC ... G10L 15/1822; G10L 13/027; G10L 21/10; G10L 15/22; G10L 25/72; G10L 2015/223; G10L 2015/225; G06F 40/20; G06F 40/30; G06T 13/00
USPC ........................................................ 704/241
See application file for complete search history.

(56) References Cited

U.S. PATENT DOCUMENTS

| 5,671,329 A * | 9/1997 | Hatazaki ............. G10L 15/1822 704/253 |
| 9,953,650 B1 * | 4/2018 | Falevsky ................. G06F 3/017 |
| 2003/0140063 A1 * | 7/2003 | Pizzorno ................. G06F 19/00 |

(Continued)

FOREIGN PATENT DOCUMENTS

| JP | H06259090 A | 9/1994 |
| JP | 2017058545 A | 3/2017 |

*Primary Examiner* — Edwin S Leland, III
(74) *Attorney, Agent, or Firm* — Dinsmore & Shohl LLP (57) ABSTRACT In an information processing apparatus, an acquisition unit acquires speech information on a user's speech. A derivation unit, derives a level of understanding of an intent of the user's speech based on the speech information acquired by the acquisition unit. A display control unit causes a display unit to display an image corresponding to the level of understanding derived by the derivation unit. An output unit outputs a response to the user's speech based on the speech information acquired by the acquisition unit.

8 Claims, 6 Drawing Sheets (56) References Cited

U.S. PATENT DOCUMENTS

| | | | |
|---|---|---|---|
| 2004/0122666 A1* | 6/2004 | Ahlenius | G10L 15/22 704/231 |
| 2006/0149544 A1* | 7/2006 | Hakkani-Tur | G10L 15/22 704/236 |
| 2006/0200350 A1* | 9/2006 | Attwater | G10L 15/08 704/251 |
| 2010/0138215 A1* | 6/2010 | Williams | G10L 15/22 704/9 |
| 2010/0180202 A1* | 7/2010 | Del Valle Lopez | G06F 3/048 715/728 |
| 2011/0161076 A1* | 6/2011 | Davis | G06K 9/6202 704/231 |
| 2013/0204881 A1* | 8/2013 | Su | G06N 5/043 707/749 |
| 2013/0297200 A1* | 11/2013 | Schalk | G10L 15/30 701/420 |
| 2014/0356846 A1* | 12/2014 | Su | G06N 5/043 434/362 |
| 2015/0025890 A1* | 1/2015 | Jagatheesan | G10L 15/32 704/255 |
| 2016/0196499 A1* | 7/2016 | Khan | G06N 5/048 706/52 |
| 2017/0084271 A1* | 3/2017 | Nakadai | G06F 3/16 |
| 2017/0353404 A1* | 12/2017 | Hodge | H04L 67/02 |
| 2017/0371861 A1* | 12/2017 | Barborak | G06N 3/006 |
| 2018/0068657 A1* | 3/2018 | Khan | G06F 9/451 |
| 2019/0096395 A1* | 3/2019 | Fujii | G10L 15/22 |
| 2019/0115008 A1* | 4/2019 | Jiang | G10L 15/22 |
| 2019/0251958 A1* | 8/2019 | Kubo | G10L 21/10 |
| 2020/0026966 A1* | 1/2020 | Nagarajan | G06K 9/6262 |

* cited by examiner

INFORMATION PROCESSING APPARATUS, INFORMATION PROCESSING METHOD, AND NON-TRANSITORY COMPUTER-READABLE STORAGE MEDIUM FOR DERIVING A LEVEL OF UNDERSTANDING OF AN INTENT OF SPEECH

CROSS-REFERENCE TO RELATED APPLICATION

This application claims priority to Japanese Patent Application No. 2018-024449 filed on Feb. 14, 2018, incorporated herein by reference in its entirety.

BACKGROUND

1. Technical Field

The present disclosure relates to an information processing apparatus configured to output a response to a user's speech, an information processing method for outputting a response to a user's speech, and a non-transitory computer-readable storage medium.

2. Description of Related Art

Japanese Unexamined Patent Application Publication No. 2017-058545 discloses a technology for developing understanding of a user's intent in a step-by-step manner through an information exchange with the user. Japanese Unexamined Patent Application Publication No. 06-259090 discloses a technology for developing understanding of a user's intent by processing a user's speech. In addition, US Patent Application Publication No. 2006/149544 discloses confidence scores (Spoken Language Understanding (SLU) Confidence Scores) acquired as a result of understanding a speaker's intent in a spoken dialogue system.

SUMMARY

It is difficult for a user of an interactive system to know the extent to which understanding of an intent of the user's speech is being developed in the interactive system. Thus, he or she cannot comprehend how much further input is needed to acquire a response to the user's speech from the interactive system. This causes inconvenience for the user.

The present disclosure provides an information processing apparatus, an information processing method, and a non-transitory computer-readable storage medium capable of improving convenience for a user when outputting a response to the user's speech.

An information processing apparatus according to a first aspect of the present disclosure includes an acquisition unit configured to acquire speech information on a user's speech, a derivation unit configured to derive the level of understanding of an intent of the speech based on the speech information acquired by the acquisition unit, a display control unit configured to cause a display unit to display an image corresponding to the level of understanding derived by the derivation unit, and an output unit configured to output a response to the speech based on the speech information acquired by the acquisition unit.

According to the first aspect, the level of understanding of the intent of the user's speech is derived and is displayed as an image on the display unit so that the level of understanding can be easily comprehended by the user. As such, the user can easily comprehend how much further input is needed to acquire a response, such that convenience for the user can be improved.

The output unit may continue to output questions regarding the speech, until the level of understanding becomes equal to or higher than a predetermined value, and output a response when the level of understanding becomes equal to or higher than the predetermined value.

The display control unit may cause the display unit to display the image divided into a first area and a second area, and increase the first area while decreasing the second area as the level of understanding increases.

The display control unit may cause the display unit to display an animated figure as the image and change expressions or actions of the animated figure according to the level of understanding.

The display control unit may change the color of the image according to the level of understanding.

The display control unit may cause the display unit to display the first area such that a proportion of the first area to the image is a proportion acquired by adding a predetermined value to the level of understanding.

A second aspect of the present disclosure is an information processing method. The method includes a step of acquiring speech it on a user's speech, a step of deriving the level of understanding of the intent of the user's speech based on the acquired speech information, a step of causing a display unit to display an image on a display unit according to the derived level of understanding, and a step of outputting a response to the speech based on the acquired speech information.

A third aspect of the present disclosure is a non-transitory computer-readable storage medium storing a program. The program includes commands for causing a computer to acquire speech information on a user's speech, derive the level of understanding of the intent of the speech based on the acquired speech information, cause a display unit to display an image on a display unit according to the derived level of understanding, and output a response to the speech based on the acquired speech information.

With each aspect of the present disclosure, convenience for the user can be improved when a response to the user's speech is output.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4A is a diagram continued from FIG. 3A, illustrating an example of the user's speech and the like;

FIG. 5A is a diagram continued from FIG. 4A, illustrating examples of the user's speech and the like;

DETAILED DESCRIPTION

Figure 1:
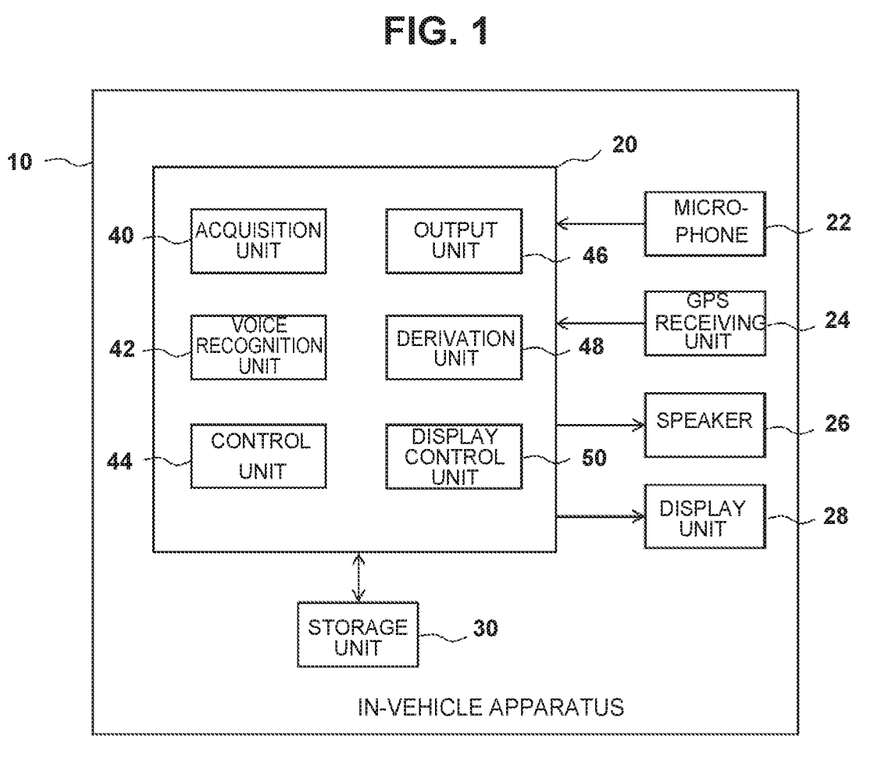
FIG. 1 is a block diagram illustrating a configuration of an in-vehicle apparatus according to an embodiment.

FIG. 1 is a block diagram illustrating a configuration of an in-vehicle apparatus 10 according to an embodiment. The in-vehicle apparatus 10 is mounted in a vehicle which is an automobile. The in-vehicle apparatus 10 includes a processing unit 20, a microphone 22, a Global Positioning System (GPS) receiving unit 24, a speaker 26, a display unit 28, and a storage unit 30.

The microphone 22 is installed in the cabin of the vehicle and acquires a voice in the vehicle cabin. The voice includes speech made by a vehicle occupant who is a user. The microphone 22 outputs data of the acquired voice to the processing unit 20.

The GPS receiving unit 24 receives signals from GPS satellites and derives a position of the subject vehicle. The position of the vehicle includes coordinates such as latitude and longitude. The GPS receiving, unit 24 outputs the position information of the vehicle to the processing unit 20.

The speaker 26 is a voice output device installed in the cabin of the vehicle and outputs voices. The display unit 28 is a display device, such as a liquid crystal display, and is installed on a center console or a dashboard of the vehicle.

The processing unit 20 includes an acquisition unit 40, a voice recognition unit 42, a control unit 44, an output unit 46, a derivation unit 48, and a display control unit 50. The processing unit 20 is an example of an information processing apparatus. The processing unit 20 may be referred to as an interactive agent or dialogue device that outputs a response to a user's speech and provides various pieces of information.

The processing unit 20 outputs a response to the user's speech, which is estimated to best match the intent of the user's speech. When the response cannot be determined, the processing unit 20 develops understanding of the intent of the user's speech in a step-by-step manner through an information exchange with the user. Specifically, when the response to the user's speech cannot be determined, the processing unit 20 outputs a question based on the speech, and determines a response based on the user's answer to the question. The processing unit 20 repeats this process until a response can be determined.

The acquisition unit 40 acquires voice data from the microphone 22. As such, the acquisition unit 40 acquires speech information on the user's speech. The acquisition unit 40 regularly acquires the position information of the vehicle from the GPS receiving unit 24. The acquisition unit 40 outputs the speech information to the voice recognition unit 42 and outputs the position information to the control unit 44.

The voice recognition unit 42 recognizes the user's speech based on the speech information output from the acquisition unit 40. Voice recognition can be executed by using commonly known technology. The voice recognition unit 42 outputs a voice recognition result to the control unit 44. The voice recognition result includes text data.

The storage unit 30 stores a plurality of pieces of predetermined candidate question data. The data structure of each candidate question data is a tree structure having a plurality of nodes. In the highest node, predetermined speech of the user is set. In each of the nodes lower than the highest node, a candidate question is set to determine a response to the user's speech which is set in the highest node. The candidate questions can be to develop understanding of the intent of the user's speech. The candidate question data, can be referred to as dialogue scenario data.

Figure 2:
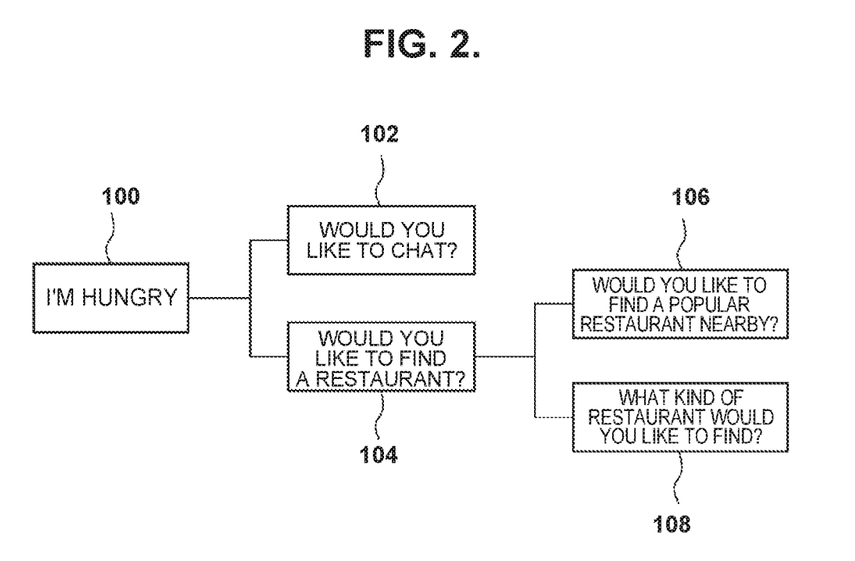
FIG. 2 is a diagram illustrating an exemplary data structure of candidate question data stored in a storage unit in FIG. 1.

FIG. 2 is a diagram illustrating an example of the data structure of the candidate question data stored in the storage unit 30 in FIG. 1. In FIG. 2, only five nodes have been illustrated to provide a clear explanation, but the number of nodes is not limited thereto. In the highest node 100, the user's speech, "I'm hungry," is set. In the lowest node 102 directly below the highest node 100, a candidate question, "Would you like to chat?" is set. In the node 104 directly below the highest node 100, a candidate question, "Would you like to find a restaurant?" is set. In the lowest node 106 directly below the node 104, a candidate question, "Would you like to find a popular restaurant nearby?" is set. Also, in the lowest node 108 directly below the node 104, a candidate question, "What kind of restaurant would you like to find?" is set.

In the present example, the intent of the user's speech, "I'm hungry," is assumed as "I want to chat" corresponding to the lowest node 102, "I want to find a popular restaurant nearby" corresponding to the lowest node 106 or "I want to find a restaurant with the kind of food that I like" corresponding to the lowest node 108. In other words, candidate questions corresponding to the assumed intent of the user's speech are set in the lowest nodes. The candidate questions for the lowest nodes include content based on, which a response can be determined when affirmative speech is acquired from the user.

The control unit 44, based on the speech recognition result by the voice recognition unit 42, determines questions and responses according to the candidate question data in which each of the candidate questions whose content corresponds to the user's speech is set in the lowest node.

Figure 3A:
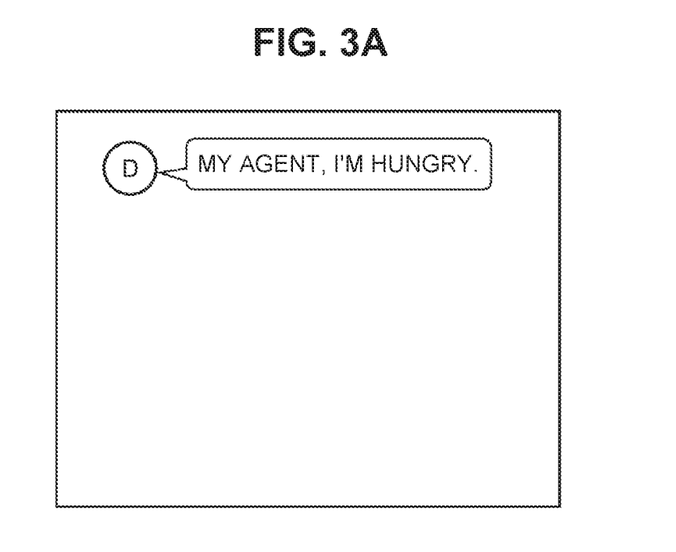
FIG. 3A is a diagram illustrating an example of a user's speech.
Figure 3B:
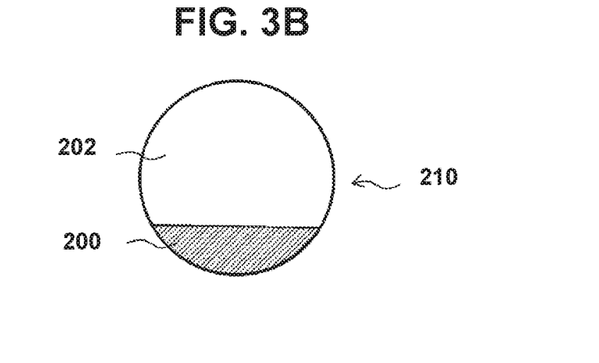
FIG. 3B is a diagram illustrating an image corresponding to the level of understanding displayed on a display unit according to the speech in FIG. 3A.

FIG. 3A is a diagram illustrating an example of the user's speech. FIG. 3B is a diagram illustrating an image 210 according to the level of understanding displayed on the display unit 28 based on the speech in FIG. 3A.

In the example of FIG. 3A, since the user's speed is "My agent, I'm hungry," the candidate question data in FIG. 2 is selected. Note that "My agent" is an activation word that activates a dialogue function of the processing unit 20.

The control unit 44 outputs "3" to a derivation unit 48, which is the number of lowest nodes in the selected candidate question data. The derivation unit 48 derives the reciprocal of the number of lowest nodes output from the control unit 44 and regards the derived value expressed as a percentage as the level of understanding of the intent of the user's speech. In the present example, the level of understanding is derived as 33%. As such, the derivation unit 48 derives the level of understanding of the intent of the user's speech based on the speech information acquired by the acquisition unit 40.

The display control unit 50 causes the display unit 28 to display the image 210 according to the level of understanding derived by the derivation unit 48. Specifically, the display control unit 50 causes the display unit 28 to display the image 210 divided into the first area 200 and the second area 202, and increases the first area 200 while decreasing the second area 202 as the level of understanding increases. For example, as illustrated in FIG. 3B, the display unit 28 displays a circular image 210 including the first area 200 which is about 33% of the area of the circular image 210 and the second area 202 which is about 77% of the area of the circular image 210. The image 210 may represent an interactive agent. Also, the image 210 may be displayed, for example, at an end of an image having a preset function such as a map with a destination guiding function.

Figure 4A:
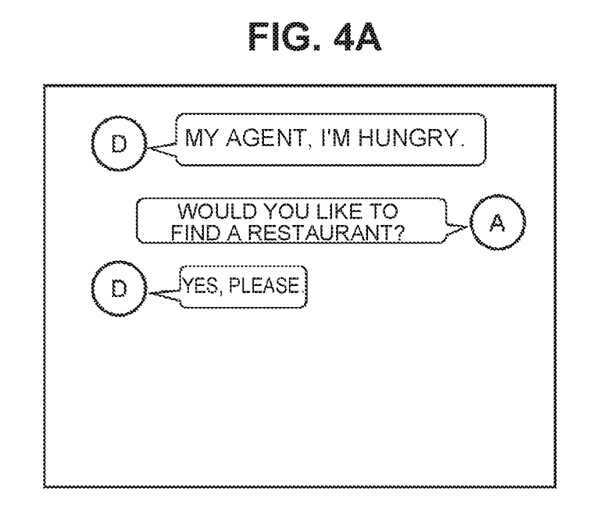
Figure 4B:
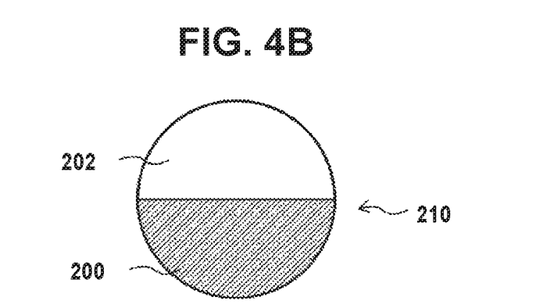
FIG. 4B is a diagram illustrating an image corresponding to the level of understanding displayed on the display unit according to the speech and the like in FIG. 4A.
Figure 4C:
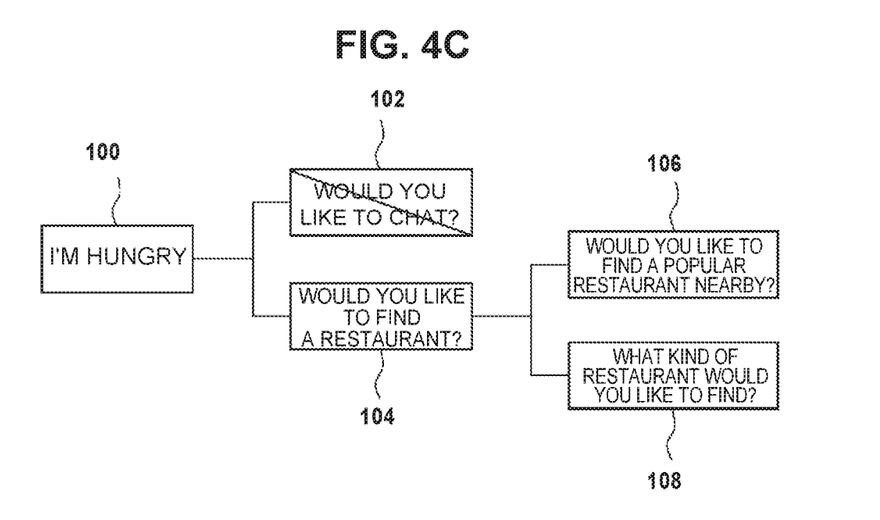
FIG. 4C is a diagram illustrating a node which is "unselected" by the speech and the like in FIG. 4A.

FIG. 4A is a diagram continued from FIG. 3A, illustrating an example of the user's speech and the like. FIG. 4B is a diagram illustrating the image 210 according to the level of understanding, based on the speech and the like in FIG. 4A, displayed on the display unit 28. FIG. 4C is a diagram illustrating a node which is "unselected" by the speech and the like in FIG. 4A.

The control unit 44 selects nodes from the highest node 100 to the lowest nodes. The control unit 44 first selects any one of the nodes directly below the highest node 100. For example, the control unit 44 first selects the node 104 which has the highest number of connections to the lowest nodes among the nodes directly below the highest node 100. The control unit 44 supplies, to the output unit 46, a candidate question, "Would you like to find a restaurant?" set in the selected node 104. Furthermore, the control unit 44 may acquire, from a server apparatus (not shown), information on a node that was selected by a plurality of users with the highest probability in the past, and select the node.

The output unit 46 outputs a question according to the candidate question supplied by the control unit 44 through the speaker 26. Specifically, the output unit 46 converts text information on the candidate question supplied from the control unit. 44 into a voice signal, and outputs the voice signal to the speaker 26. The speaker 26 outputs the question via voice based on the voice signal output from the output unit 46.

As illustrated in FIG. 4A, when the acquisition unit 40 acquires, as the user's answer to the question, speech information, for example "Yes, please," indicating that the question matches the intent of the user's speech, the control unit 44 outputs, to the derivation unit 48, "2" which is the number of lowest nodes below the selected node 104, and selects any one of the nodes directly below the selected node 104. An example of selecting a node will be described below. As illustrated in FIG. 4C, since it is determined that the node 102 does not match the intent of the user's speech, it is "unselected."

The derivation unit 48 derives the level of understanding as 50% based on the number of lowest nodes output from the control unit 44. As illustrated in FIG. 4B, the display unit 28 displays an image 210 including a first area 200 which is about 50% of the area of the image 210 and a second area 202 which is about 50% of the area of the image 210. Since the first area 200 in the image 210 of FIG. 4B has increased, compared to the image 210 of FIG. 3B, the user can easily comprehend that understanding of the intent of the user's speech is being developed.

Figure 5A:
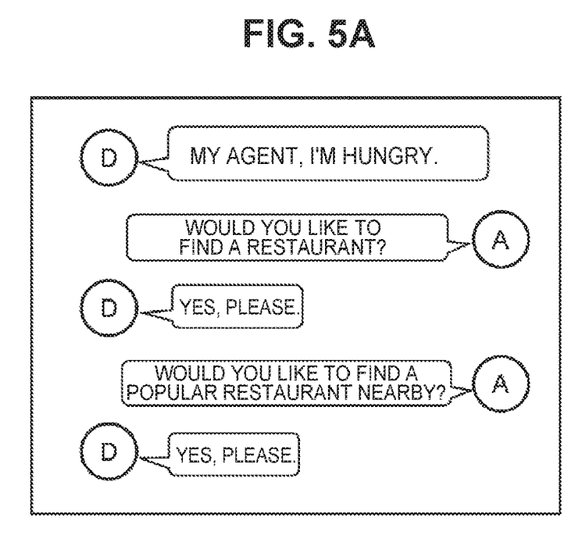
Figure 5B:
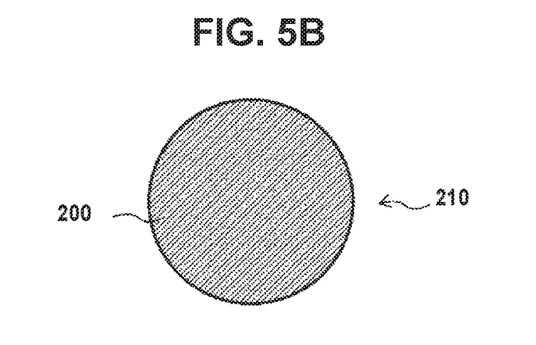
FIG. 5B is a diagram illustrating an image corresponding to the level of understanding displayed on the display unit according to the speech, and the like in FIG. 5A.
Figure 5C:
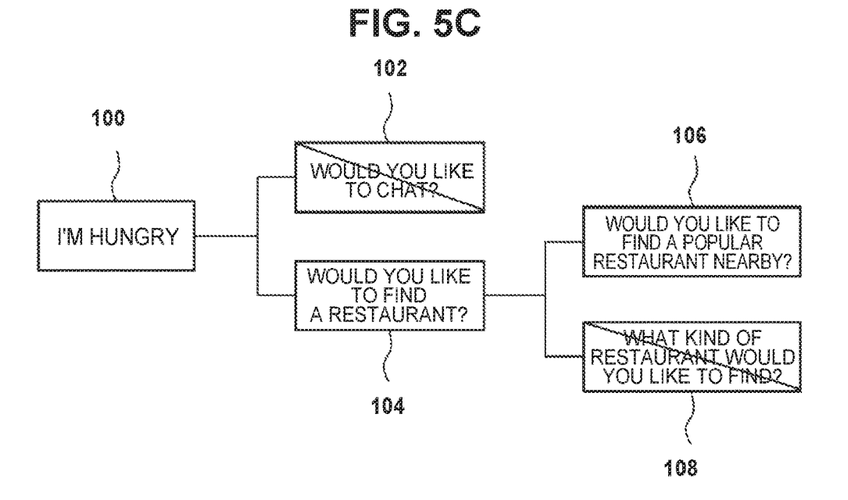
FIG. 5C is a diagram illustrating nodes which are "unselected" by the speech and the like in FIG. 5A.

FIG. 5A is a diagram continued from FIG. 4A, illustrating an example of the user's speech and the like. FIG. 5B is a diagram illustrating the image 210 according to the level of understanding displayed on the display unit 28 based on the speech and the like in FIG. 5A. FIG. 5C is a diagram illustrating nodes which are "unselected" by the speech and the like in FIG. 5A.

The control unit 44 selects, for example, the lowest node 106 directly below the node 104. The control unit 44 supplies, to the output unit 46, a candidate question set in the selected lowest node 106, "Would you like to find a popular restaurant nearby?" The output unit 46 outputs a question, through the speaker 26, according to the candidate question supplied from the control unit 44.

As illustrated in FIG. 5A, when the acquisition unit 40 acquires speech information, for example "Yes, please," indicating that the question matches the intent of the user's speech, as the user's answer to the question according to the candidate question set in the lowest node 106, the control unit 44 outputs, to the derivation unit 48, "1" which is the number of confirmed lowest nodes that is the lowest node 106 and prepares a response corresponding to the candidate question set in the confirmed lowest node 106.

The control unit 44 searches for a popular restaurant around the position of the subject vehicle based on the position information output from the acquisition unit 40, map data and the like stored in the storage unit 30. Based on the search result, the control unit 44 prepares a response, for example, "Here are some popular restaurants around you. Restaurant XXX is nearby," and supplies the response to the output unit 46. The control unit 44 may acquire data that is needed to prepare a response from the server apparatus (not shown) or from an in-vehicle apparatus of another vehicle via wireless communication. The output unit 46 outputs the response supplied from the control unit 44 through the speaker 26.

The derivation unit 48 derives the level of understanding as 100% based on the number of lowest nodes output from the control unit 44. As illustrated in FIG. 5B, the display unit 28 displays the image 210 including the first area 200 which is about 100% of the area of the image 210. When the user sees the image 210, he or she can comprehend that understanding of the intent of the user's speech has been completed. The image showing the level of understanding of 100% may not be displayed.

Meanwhile, when the acquisition unit 40 acquires, as the user's answer to the question, speech information indicating that the question does not match the user's intent, for example, "No," the control unit 44 sets the selected node as "unselected" and selects another node in the same hierarchy as the unselected node. The control unit 44 supplies the candidate question set in the selected node to the output unit 46. Furthermore, the control unit 44 outputs, to the derivation unit 48, the number of lowest nodes which is acquired by subtracting the number of lowest nodes below the "unselected" node from the total number of lowest nodes in the candidate question data.

For example, when the acquisition unit 40 acquires the speech information, "No," with respect to the question, "Would you like to find a restaurant?" according to the candidate question set in the node 104, the control unit 44 sets the node 104 to "unselected," and selects the node 102 which is another node in the same hierarchy as the "unselected" node 104. The control unit 44 supplies, to the output unit 46, the candidate question set in the selected node 102, "Would you like to chat?" Furthermore, the control unit 44 outputs, to the derivation unit 48, the number of lowest nodes which is acquired by subtracting the number of lowest nodes below the "unselected" node 104 from the total number of lowest nodes, that is, the control unit 44 outputs "1" which is acquired by subtracting "2" from "3."

As such, every time an answer to a question is acquired by the acquisition unit 40, the number of selectable lowest nodes decreases whereas the level of understanding increases. The control unit 44 continues to select nodes until the level of understanding becomes equal to or higher than a predetermined value, and the output unit 46 continues to output questions regarding the speech until the level of understanding becomes equal to or higher than the predetermined value. Then, the output unit 46 outputs a response to the speech when the level of understanding becomes equal to or higher than the predetermined value. In the example described above, the predetermined value is 100%.

The predetermined value may be 50% or the like, in this case, when, for example, the level of understanding becomes 50%, the control unit 44 selects the lowest node 106 directly below the node 104, prepares a response, "Here are some popular restaurants around you. Restaurant XXX is nearby," based on the question candidate set in the lowest node 106, "Would you like to find a popular restaurant nearby?" and supplies the response to the output unit 46. In other words, the output unit 46 outputs a response without outputting a question according to the candidate question set in the lowest node 106. When the acquisition unit 40 acquires speech such as "No" with respect to the response, the control unit 44 supplies, to the output unit 46, the candidate question set in the other lowest node 108, "What kind of restaurant would you like to find?"

Furthermore, the storage unit 30 may store history information of the user. The history information includes information on responses made in the past to the same speech and information on the output probability of past responses to the same speech with respect to each of a plurality of past speeches of the user.

For example, regarding the user's speech, "I'm hungry," the history information includes information indicating that the response, "Here are some Italian restaurants," has an output probability of 80%, the response, "Here are some French restaurants," has an output probability of 15%, and the response, "Here are some popular restaurants nearby," has an output probability of 5%.

When past responses to the speech acquired by the acquisition unit 40 are stored in the storage unit 30, the control unit 44 selects a suitable past response based on the past responses to the speech and the output probability of the past responses. For example, the control unit 44 selects the past response that has the highest output probability. Then, the control unit 44 prepares a question to confirm whether or not the selected past response matches the intent of the user's speech, and supplies the prepared question to the output unit 46.

With respect to the question for confirmation, when the acquisition unit 40 acquires speech information indicating that the selected past response matches the intent of the user's speech, the control unit 44 prepares a response based on the selected past response and supplies the prepared response to the output unit 46.

However, with respect to the question for confirmation, when the acquisition unit 40 acquires speech information indicating that the selected past response does not match the intent of the user's speech, the control unit 44 determines a new question and a new response by using the candidate question data as described above.

When the history information is used as described above, the maximum value of the output probabilities of past responses may be referred to as the level of understanding.

The configuration of the present disclosure can be implemented in hardware such as a Central Processing Unit (CPU), memory, or other Large-Scale Integration (LSI) circuits of a certain computer, and implemented in software such as a program loaded in memory and the like. In the present application, functional blocks implemented by a combination of hardware and software are illustrated. Accordingly, a person skilled in the art would understand that the functional blocks can be implemented in various forms by hardware alone, software alone, or a combination thereof.

As described above, according to the present embodiment, since the level of understanding of the intent of the user's speech is derived and displayed as an image 210 on the display unit 28, the level of understanding can be easily comprehended by the user. Accordingly, the user can easily comprehend how much further input is needed to acquire a response, such that convenience for the user is improved.

In addition, since the output unit 46 continues to output questions regarding the speech until the level of understanding becomes equal to or higher than the predetermined value and outputs a response when the level of understanding becomes equal to or higher than the predetermined value, it is possible to increase the level of understanding based on the user's answers to the questions, and to output a response that is estimated to best match the intent of the user's speech.

Moreover, since the image 210 divided into the first area 200 and the second area 202 is displayed on the display unit 28 and the first area 200 is increased while the second area 202 is decreased as the level of understanding increases, the user can easily see the change in the level of understanding.

The present disclosure has been described as above based on the embodiments. A person skilled in the art would understand that the embodiments are merely illustrative and other variations may be made according to combinations of each component and each process within the technical scope of the present disclosure.

Figure 6A:
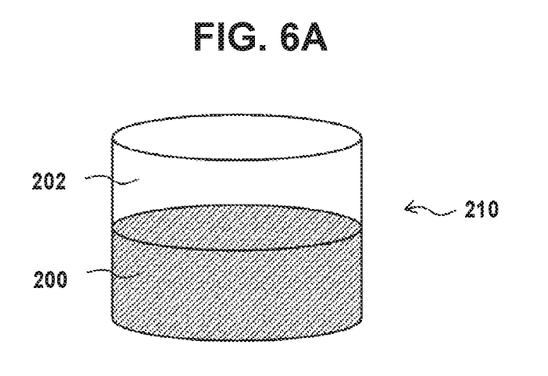
FIG. 6A is a diagram illustrating another exemplary image corresponding to the level of understanding displayed on the display unit.
Figure 6B:
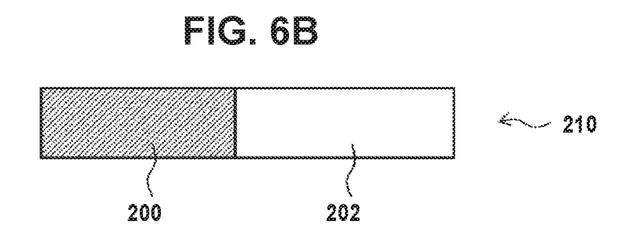
FIG. 6B is a diagram illustrating yet another exemplary image corresponding to the level of understanding displayed on the display unit.

For example, the mode of displaying the image 210 according to the level of understanding is not limited to the example described above. FIGS. 6A and 6B show other examples of the image 210 according to the level of understanding displayed on the display unit 28. The image 210 according to the level of understanding may be a cylindrical image 210 as illustrated in FIG. 6A, a rectangular image 210 as illustrated in FIG. 6B or other shapes.

Moreover, although not illustrated, the display control unit 50 may cause the display unit 28 to display an animated figure as the image corresponding to the level of understanding and change expressions or actions of the animated figure according to the level of understanding. The animated figure may represent the interactive agent. In addition, the display control unit 50 may change the color of a given image according to the level of understanding. The given image may be an image or an animated figure representing the interactive agent. In these variations, the degree of freedom in displaying an image corresponding to the level of understanding can be improved.

In addition, the above embodiments describe examples in which the display unit 28 displays the first area 200 such that a proportion of the first area 200 to the image is a proportion substantially matching the level of understanding but the examples are not limited thereto. For example, the display unit 28 may display the first area 200 such that a proportion of the first area 200 to the image is a proportion acquired by adding a predetermined value to the level of understanding. For example, when the total number of lowest nodes in the candidate question data is 100, the initial level of understanding is 1%. However, in cases such as the above, the first area 200 may be displayed such that a proportion of the first area 200 to the image is a proportion acquired by adding the predetermined value of, for example, 10% to the level of understanding. Accordingly, the user would not be given the impression that the user's intent is being hardly understood.

In addition, the output unit 46 may output the question and the response supplied from the control unit 44 in the form of text through the display control unit 50 and the display unit 28.

Moreover, although the in-vehicle apparatus 10 has been described by way of example, the in-vehicle apparatus 10 may be a smart phone, a personal computer or the like that is not mounted in the vehicle.

What is claimed is:

1. An information processing apparatus comprising:
    a processing unit configured to:
        acquire speech information on a user's speech;
        determine a set of questions corresponding to the acquired speech information, wherein responses to the set of questions increases a level of understanding;
        derive the level of understanding of an intent of the user's speech based on a reciprocal of a number of questions within the set of questions;
        cause a display unit to display an image corresponding to the derived level of understanding, wherein the image is a shape divided into a first area and a second area, wherein the first area represents the derived level of understanding; and
        output a response to the user's speech based on the acquired speech information.

2. The information processing apparatus according to claim 1, wherein the processing unit is configured to output questions regarding the user's speech until the level of understanding becomes equal to or higher than a predetermined value, and output the response when the level of understanding becomes equal to or higher than the predetermined value.

3. The information processing apparatus according to claim 1, wherein the processing unit is configured to cause the display unit to display the shape divided into the first area and the second area, and increase the first area while decreasing the second area as the level of understanding increases.

4. The information processing apparatus according to claim 3, wherein the processing unit is configured to cause the display unit to display the first area such that a proportion of the first area to the image is a proportion acquired by adding a predetermined value to the level of understanding.

5. The information processing apparatus according to claim 1, wherein the processing unit is configured to cause the display unit to display an animated figure and change expressions or actions of the animated figure according to the level of understanding.

6. The information processing apparatus according to claim 1, wherein the processing unit is configured to change a color of the image according to the level of understanding.

7. An information processing method comprising:
    acquiring speech information on a user's speech;
    determining a set of questions corresponding to the acquired speech information, wherein responses to the set of questions increases a level of understanding;
    deriving the level of understanding of an intent of the user's speech based on the acquired speech information and a reciprocal of a number of questions within the set of questions;
    causing a display unit to display an image corresponding to the derived level of understanding, wherein the image is a shape divided into a first area and a second area, wherein the first area represents the derived level of understanding; and
    outputting a response to the user's speech based on the acquired speech information.

8. A non-transitory computer-readable storage medium storing a program, wherein the program includes commands for causing a computer to:
    acquire speech information on a user's speech;
    determine a set of questions corresponding to the acquired speech information, wherein responses to the set of questions increases a level of understanding;
    derive the level of understanding of an intent of the user's speech based on the acquired speech information and a reciprocal of a number of questions within the set of questions;
    cause a display unit to display an image corresponding to the derived level of understanding, wherein the image is a shape divided into a first area and a second area, wherein the first area represents the derived level of understanding; and
    output a response to the user's speech based on the acquired speech information.

* * * * *

UNITED STATES PATENT AND TRADEMARK OFFICE
CERTIFICATE OF CORRECTION

PATENT NO.        : 10,978,055 B2
APPLICATION NO.   : 16/273481
DATED             : April 13, 2021
INVENTOR(S)       : Chikage Kubo and Takuji Yamada Page 1 of 1

It is certified that error appears in the above-identified patent and that said Letters Patent is hereby corrected as shown below:

In the Specification

In Column 3, Line(s) 35, after "receiving", delete ",".

In Column 4, Line(s) 41, after "on", delete ",".

Signed and Sealed this
Twentieth Day of July, 2021

Drew Hirshfeld
*Performing the Functions and Duties of the
Under Secretary of Commerce for Intellectual Property and
Director of the United States Patent and Trademark Office*